Dec. 25, 1934.　　　　F. E. HAND　　　　1,985,370
TRACTOR PLANTER
Filed Jan. 14, 1931　　　3 Sheets-Sheet 1

Inventor
Frederick E. Hand
By H. P. Davies
Atty

Dec. 25, 1934.  F. E. HAND  1,985,370
TRACTOR PLANTER
Filed Jan. 14, 1931    3 Sheets-Sheet 2
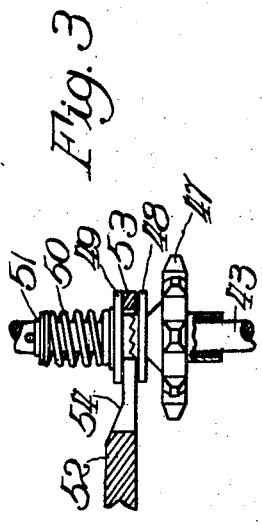
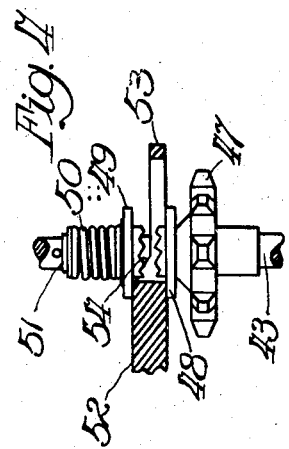
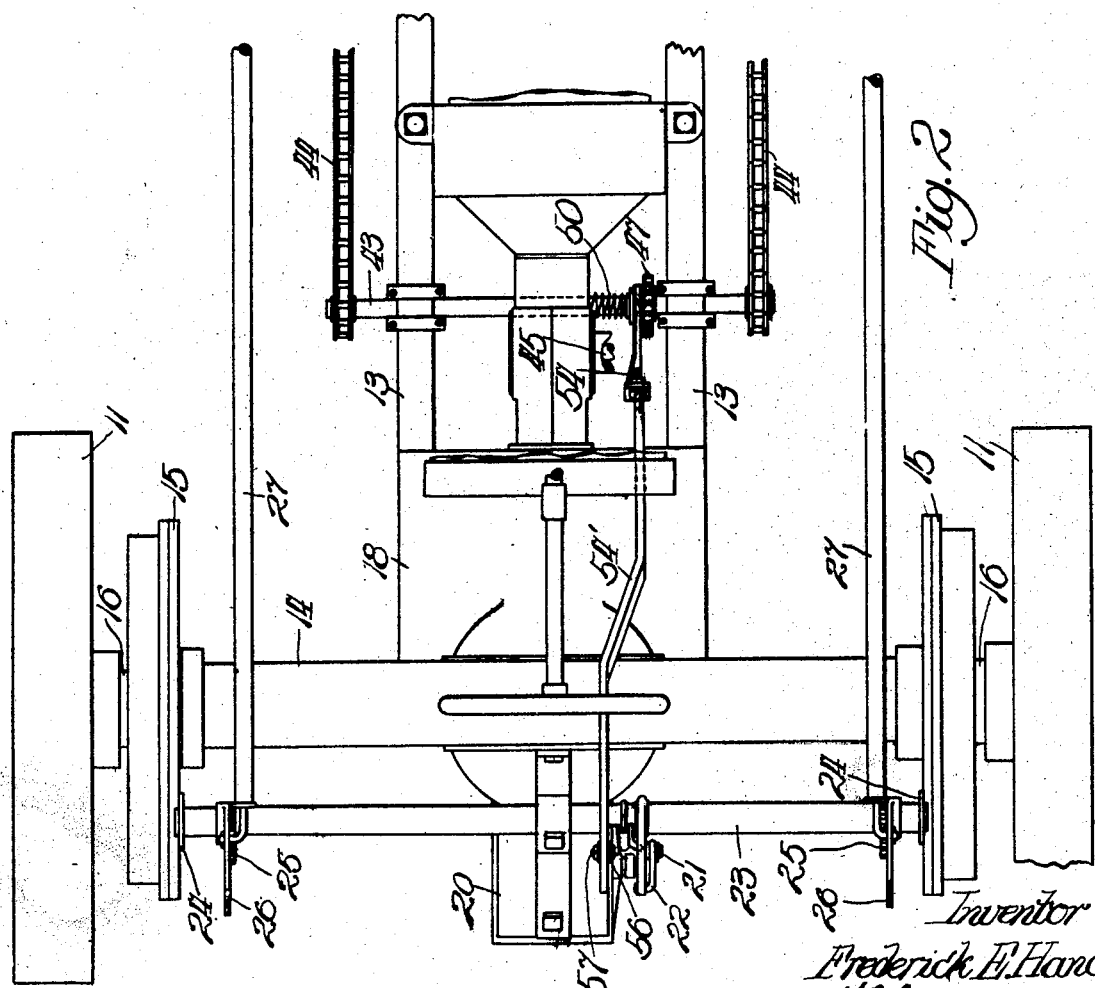

Dec. 25, 1934.   F. E. HAND   1,985,370
TRACTOR PLANTER
Filed Jan. 14, 1931   3 Sheets-Sheet 3
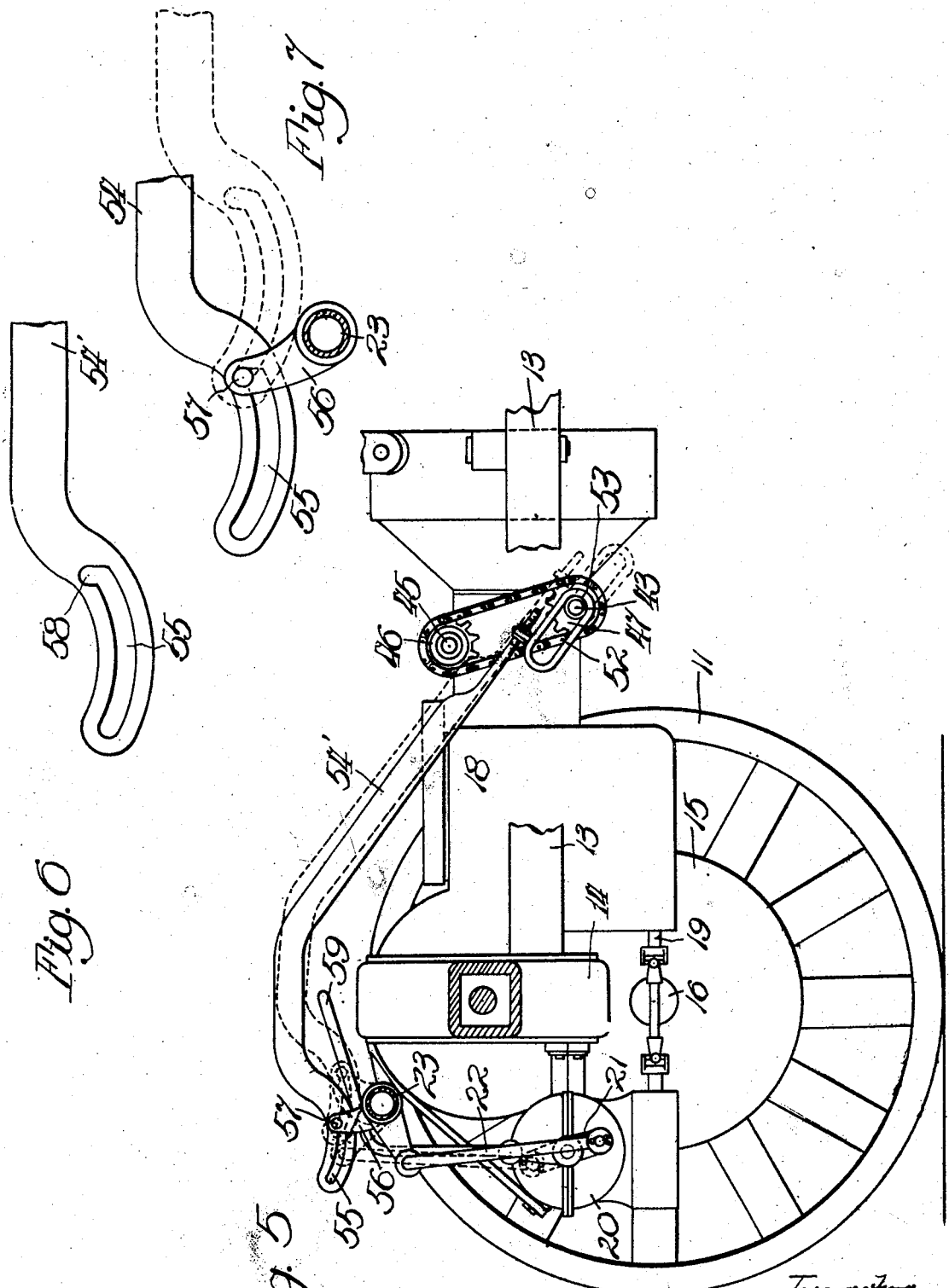
Inventor
Frederick E. Hand Patented Dec. 25, 1934

1,985,370

UNITED STATES PATENT OFFICE 1,985,370

TRACTOR PLANTER

Frederick E. Hand, Canton, Ill., assignor to International Harvester Company, a corporation of New Jersey Application January 14, 1931, Serial No. 508,719

7 Claims. (Cl. 97—47)

This invention relates to tractor propelled planters or the like. More particularly, the invention relates to control means for such a mechanism.

The principal object of the invention is to provide a novel clutch control for a tractor mounted planter driving mechanism.

Another object is to provide a clutch mechanism which may be operated by a power lift mounted on a tractor.

Another object is to interconnect the clutch operating mechanism with the implement lifting means, in such a manner that the clutch, which drives a mechanism operative when the implement is in working position, will be thrown out when the implement is lifted.

Another object is to provide means for operating the clutch throw-out mechanism independently of the power lift for the implement.

These and other objects, which will be apparent, are accomplished by the novel construction described in the following specification.

In the drawings:

Figure 2 is an enlarged plan view of the rear portion of the tractor shown in Figure 1, showing the drive controlling mechanism of the invention;

Figures 3 and 4 are enlarged detail views, showing the clutch utilized in this embodiment of the invention;

Figure 5 is a plan view, partly in section, showing the clutch control mechanism of the invention in one position in full lines and in another position in dotted lines; and, Figures 6 and 7 are enlarged details, showing the means which permit manual operation of the clutch throw-out lever.

Figure 1:
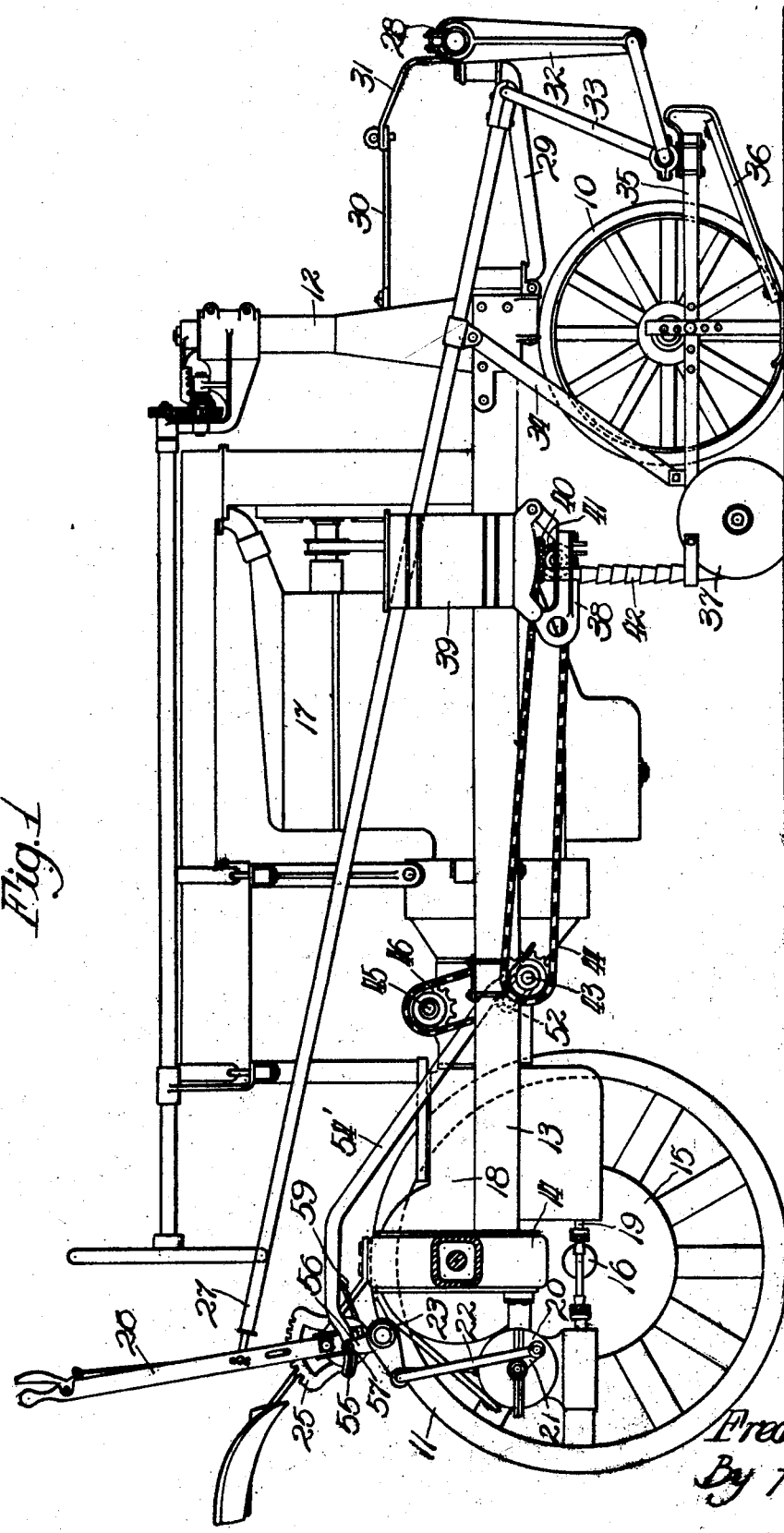
Figure 1 illustrates the invention embodied in a tractor operated planter.

The tractor shown in the illustration is of a conventional row crop type having a front rolling support 10 and widely spaced rear wheels 11. The front rolling support is mounted below a steering column 12, which is mounted on the frame of the tractor. The tractor frame consists in part of side frame members 13, which are spaced comparatively close together, permitting the mounting of implements at either side thereof for the planting and cultivation of row crops. The tractor is provided at the rear with an axle housing 14, which is secured to the frame. Depending housings 15 contain gears which drive a stub axle 16 on which the wheels 11 are mounted. This rear axle construction is ordinarily termed as an arched axle construction and the tractor is particularly suitable for the mounting of implements such as described herein.

Power from the engine 17 is transmitted through a shaft to a gear transmission casing 18. By means of conventional transmission gears, power is delivered through a differential and through the depending housings 15 to the rear wheels. Below the transmission casing 18, means are provided for driving a power take-off shaft 19. A power lift casing 20 is mounted at the rear of the axle housing 14 and is adapted to be driven from the power take-off shaft 19. The particular power lift shown in the drawings is identical with that disclosed and claimed in the co-pending application Serial No. 489,822 filed October 20, 1930. It is provided with a clutch for putting the mechanism contained therein into operation. The crank arm 21, which extends from the power lift housing, is rotated half revolutions by the power lift mechanism. It is to be understood that any power lift could be utilized which provided means for reciprocating an actuating member, such as the link 22 utilized in the construction shown.

A rockshaft 23 is mounted transversely behind the rear axle housing 14 in brackets 24 mounted on the housings 15. The rockshaft is provided with quadrants 25, one of which can be seen in Figure 1, and levers 26 adjusted along the quadrants 25. A beam 27 pivotally attached to each of the levers 26 extends forwardly for carrying and providing means for lifting soil working implements. A transverse beam 28 is mounted forwardly of the tractor on links 29 and so mounts the bar 28 that it may have lateral motion with respect to the tractor. A steering member 30 is attached to the steering column 12 and to a member 31 operative to shift the bar 28 laterally with angular movements of the steering column. Depending arms 32 from the beam 28 provide a means of support for a particularly shaped implement carrying bar 33. The beam 27 is pivotally attached to the bar 33 and provides means for lifting said bar and the forward end of an implement attached thereto. A second bar 34 is attached to the beam 27 at a rearwardly spaced point and to the rear of the implement, to provide means for lifting the rear portion of said implement. The implement illustrated comprises a frame structure 35 on which a ground engaging shoe 36 is attached. A furrow opening and seed depositing means 37 is also mounted on the implement frame. On the tractor frame, a seed dispensing mechanism is rigidly mounted with respect to the frame. Said mechanism comprises a supporting base 38, a tiltable seed hopper 39, and a seed distributing mechanism, not shown in detail. Said mechanism may be of any conventional nature. It is driven by a horizontally positioned gear 40, which is in turn driven by a gear 41 mounted for rotation on a horizontal axis. The particular details of this construction are not shown, as they contain no novel features and could obviously be constructed by any person skilled in the art. A flexible seed tube 42 leads from the dispensing mechanism to the seed depositing means 37.

As best shown in Figure 2, a transverse shaft 43 is mounted on the tractor frame on bearing brackets attached to the frame members 13. As best shown in Figure 2, chain sprockets are mounted at either end of the shaft 43 by means of which, through chains 44, the forwardly located seeding mechanisms are driven. Means are provided for driving a shaft 45 from the drive shaft of the tractor. This means is not shown in detail, as any suitable gearing arrangement may be utilized. The shaft 45 carries a chain sprocket 46, which is in alignment with a chain sprocket 47 and the shaft 43. A chain connects said sprockets, and, during normal operation of the tractor, the sprockets are in continuous operation.

The chain sprocket 47 is mounted for free rotation on the shaft 43. To provide for locking said sprockets with respect to the shaft, a ratchet tooth clutch is provided, as shown in Figures 3 and 4. Said clutch consists of mating clutch members 48 and 49. The member 48 is mounted rigidly with respect to the sprocket 47. The member 49 is keyed onto the shaft 43. The particular details of this construction are not shown, as they are well known mechanics. A spring 50, abutting against a stop 51, normally engages the clutch 49 with the member 48. Said members are provided with flanges which are slidably spaced apart when the members are engaged. A clutch operating member 52 is provided with a slot slidable over the central portion of the clutch members 48 and 49. The forward portion 53 of said member is flattened to allow engagement of the clutch members. A cam surface 54 tapers rearwardly from the flattened portion to a thicker portion, which, when the clutch member is pushed forwardly, engages the flanges thereon and separates the members, thereby disengaging them.

An actuating lever 54' is attached to the clutch operating member 52 and extends upwardly rearwardly over the rear axle housing of the tractor. Beyond the rear axle housing, the actuating lever 54' is bent downwardly, as shown in Figures 5, 6 and 7, and provided with a curved, longitudinally extending slot 55.

The rockshaft 23 previously described is provided with an upwardly extending crank arm 56, which carries a crank pin 57. The crank pin is mounted in the slot 55 and is of a size to slide freely in said slot. At the forward end of the slot, an upwardly cut notch 58 is formed, into which the crank pin 57 fits.

The operation of this device will be clear from the above detailed description. The power lift, which is operated by the lever 59, visible in Figure 5, operates the rockshaft 23 to raise and lower the soil working implement, which in this particular illustration is a furrow opening and seed depositing implement. At the same time, when the implement is raised out of operative position, it is desirable to stop the operation of the seed dispensing mechanism. This is brought about in the following manner:

The actuating lever 54', in normal position, is seated with the crank pin 57 in engagement with the notch 58. When the rockshaft rotates forwardly, the actuating lever 54' is pushed downwardly forwardly, thereby moving the clutch operating member 52 forwardly from the position shown in Figure 3 to that shown in Figure 4. In this manner, the clutch members 48 and 49 are disengaged and the operation of the seeding mechanism is stopped. The disengaged position of the clutch is shown in Figure 5 with the actuating lever and the power lift shown in the dotted line positions. When it is desired to again re-engage the clutch and lower the implements into working position, the power lift is operated to rotate a second half revolution, or to the full-line position shown in Figure 5. In this operation, the actuating lever 54' is moved rearwardly and the spring 50 again engages the clutch members 48 and 49.

It will be noted that the actuating lever 54' extends over the rear axle housing in spaced relation thereto and is provided with a flattened horizontal portion. An inspection of Figure 1 will show that said horizontal portion is within easy reach of the driver seated on the tractor. Under certain conditions, it may be found desirable to discontinue the operation of the seeding mechanism when it is not found desirable to lift the implements from the soil. It may also be found necessary to disengage the seeding mechanism when the tractor is not in operation.

This may be accomplished by the operator by lifting the actuating lever upwardly until the notch 58 is disengaged from the crank pin 57, and manually moving the lever forwardly. The crank pin 57 slides along the slot 55, permitting the lever to be moved forwardly until the clutch is disengaged. When the power lift is again utilized, assuming the clutch to be in disengaged position, the crank pin 57 moves forwardly along the slot 55, again engaging the notch 58. It will thus be seen that, after the actuating lever has been manually operated, it automatically is caught by the rockshaft by a forward rotation thereof, so that thereafter the lever is mechanically operated by the power lift.

It will be understood that applicant has shown only a preferred embodiment of this planter drive controlling mechanism and that he claims as his invention all modifications thereof falling within the scope of the appended claims.

What is claimed is:

1. A planter drive controlling mechanism comprising, in combination with a tractor having a rearwardly positioned transmission, a power take-off shaft mounted forwardly of the transmission, a driving element rotatably mounted adjacent said shaft, means for operatively connecting the shaft to said element, including a clutch, a rock shaft mounted at the rear of the tractor, a power lift operatively connected to said shaft, an upwardly extending crank arm secured to the shaft, an actuating link operatively connecting said crank arm to the clutch, the connection between the crank and the link being formed by a pin on the crank and a notched slot in the link whereby the link may be raised out of engagement with the pin and operated manually.

2. A planter drive controlling mechanism comprising, in combination with a tractor power take-off and a tractor operated power lift, a shaft operated from the power take-off, driving means for operatively connecting said shaft to a planter mechanism, a rockshaft, means operated from the power lift for altering the angular position of said rockshaft, a clutch in the driving means, and an actuating link connecting said clutch with the rockshaft, the connection between the link and the rockshaft being formed by a crank carrying a pin mounted thereon and a notched slot in the link whereby the link may be raised out of engagement with the pin and operated manually.

3. A planter drive controlling mechanism comprising, in combination with a tractor having an arched rear axle, seed dispensing mechanisms mounted on the tractor at the sides thereof, seed depositing mechanisms floatingly mounted at the sides of the tractor, means for driving the dispensing mechanisms from a power take-off connection, a clutch interposed in said means, a rock shaft mounted longitudinally of the rear axle, a power lift device mounted on the rear axle having a crank operatively connected to the rock shaft, means for operating said device from a power take-off connection, means connected to the rock shaft and to the depositing mechanisms for altering the vertical position of said mechanisms and a link attached to the rock shaft and to the clutch, whereby the seeding mechanisms are thrown out of operation when the depositing units are lifted to inoperative position.

4. A planter drive controlling mechanism comprising, in combination with a tractor having a rear axle housing, a power take-off shaft mounted forwardly of said housing, a driving element rotatably mounted adjacent said shaft, means for operatively connecting the shaft to said element including a clutch, a rockshaft mounted on the rear axle housing, a power lift carried by the housing and operatively connected to said shaft, a crank arm secured to said shaft, and an actuating linkage operatively connecting said crank arm to the clutch, the connection between the crank and the linkage comprising a lost motion construction and a manually releasable engaging means between said lost motion connection and the crank arm.

5. A planter drive controlling mechanism comprising, in combination with a tractor having a power take-off, a tractor operated power lift, and a shaft operated from the power take-off, of a planter mechanism mounted on the tractor, driving means for operatively connecting said shaft to the planter mechanism, a rockshaft on the tractor, means operated from the power lift for altering the angular position of said rockshaft, a clutch in the driving means, a crank arm mounted on the rockshaft, and an actuating link connecting said clutch with the crank arm, the connection between the actuating link and the crank arm being formed by a notch provided on the link engageable with a portion of the crank arm whereby the link may be raised out of engagement with the pin and operated manually.

6. A planter drive controlling mechanism comprising, in combination with a tractor having a power take-off, a tractor operated power lift, and a shaft operated from the power take-off, of a planter mechanism mounted on the tractor driving means for operatively connecting said shaft to the planter mechanism, a rockshaft on the tractor, means operated from the power lift for altering the angular position of said rockshaft, a clutch in the driving means, a crank arm mounted on the rockshaft, an actuating link connecting said clutch with the crank arm, and means formed as part of the actuating link positioned to be engaged by said crank arm during alteration of the angular position of the rockshaft for operating the clutch, said means being formed to permit lifting of the actuating link whereby it may be lifted and operated manually and whereby during a subsequent operation of the rockshaft the link when released will again be engaged by the crank arm.

7. A planter drive controlling mechanism comprising, in combination with a tractor having seed dispensing mechanisms mounted at the sides thereof, seed depositing mechanisms pivotally connected to the tractor at the sides thereof, means for driving seed dispensing mechanisms from a power take-off connection with the tractor drive mechanism, a clutch interposed in said means, a rockshaft mounted at the rear of the tractor transversely thereof, a power lift on the tractor operative to oscillate said shaft, means connecting the rockshaft to the depositing mechanisms for altering their vertical position, an operating link connected to the clutch, and means for connecting said link to the rockshaft whereby the operation of the seeding mechanisms is controlled with the lifting and lowering of the depositing mechanisms, said means consisting of a releasable connection for manual operation and automatically re-engageable for subsequent operation by the rockshaft.

FREDERICK E. HAND.